US006051788A

United States Patent [19]

Nichols

[11] Patent Number: 6,051,788

[45] Date of Patent: Apr. 18, 2000

[54] ELECTRICAL OUTLET SAFETY PLATE

[76] Inventor: David R. Nichols, 513 W. Grand, Eufaula, Okla. 74432

[21] Appl. No.: 09/042,536

[22] Filed: Mar. 17, 1998

[51] Int. Cl.[7] .......... H02G 3/14

[52] U.S. Cl. .......... 174/67; 220/242

[58] Field of Search .......... 174/66, 67; 220/3.8, 220/241, 242

[56] References Cited

U.S. PATENT DOCUMENTS

| | | | |
|---|---|---|---|
| D. 310,319 | 9/1990 | Brookman . | |
| 2,634,016 | 4/1953 | Hagen . | |
| 3,363,216 | 1/1968 | Benedetto . | |
| 4,059,327 | 11/1977 | Vann . | |
| 4,293,173 | 10/1981 | Tricca | 174/67 X |
| 4,760,215 | 7/1988 | Cook et al. | 174/67 |
| 4,801,271 | 1/1989 | Piper | 174/67 X |
| 4,918,259 | 4/1990 | Hanson . | |
| 4,936,794 | 6/1990 | Shaw et al. . | |
| 5,096,439 | 3/1992 | Arnett | 174/66 X |
| 5,589,665 | 12/1996 | Scamacca . | |
| 5,856,633 | 1/1999 | Zelkovsky | 174/67 |
| 5,932,845 | 8/1999 | Lacy | 174/67 |

*Primary Examiner*—Dean A. Reichard

*Attorney, Agent, or Firm*—Richard C. Litman

[57] ABSTRACT

An electrical outlet safety plate is configured to preclude simultaneous contact of the fingers of a person with the electrical contact prongs of an electrical plug, when the prongs of the plug are also in contact with the electrical contacts of a receptacle protected by the present safety plate. The plate has a depth which is greater than standard, preferably about one half inch. The electrical receptacles of an outlet protected by the present plate, are correspondingly recessed below the outer or front face of the plate. The receptacle access passages through the plate are configured to fit closely about the periphery of a conventional electrical plug having generally curved opposite sides and straight, flattened top and bottom surfaces. Thus, when an electrical plug is inserted into a receptacle recess of the present plate to a depth sufficient for the prongs of the plug to contact the electrical contacts within the receptacle, the face of the plug is at least coplanar with the outer face of the safety plate, thus precluding contact of a person's fingers with the prongs of the plug when they are in contact with the electrical contacts within the receptacle. Various embodiments of covers or guards for the receptacle recesses of the present safety plate are also disclosed, with each of the guards gripping the interior walls of the receptacle recesses of the present plate to provide a secure installation as desired.

11 Claims, 7 Drawing Sheets

ELECTRICAL OUTLET SAFETY PLATE

BACKGROUND OF THE INVENTION

1. Field of the Invention

The present invention relates generally to cover plates for electrical components, and more specifically to a cover plate for electrical outlets which provides greater safety than conventional plates. The present outlet cover plate is deeper than the conventional plate, with recesses therein for closely fitting about and accepting conventional electrical appliance plugs therein.

2. Description of the Related Art

Efforts have been made since the initial development of electrical power for the home and industry, to provide safe utilization of such electrical power without endangering the users of such power. While the nominal 110 volts provided at most household electrical outlets is generally not fatal when encountered by an adult in good condition, it is nonetheless somewhat dangerous, and can be fatal, depending upon the age of the person receiving such a shock, the environment, etc. Accordingly, it has become customary to construct many of the components of electrical systems and devices which a person likely to encounter, of electrically non-conductive materials, such as plastic and wood.

Nonetheless, it is still possible to receive an electrical shock through intentional or inadvertent contact with the electrically active contacts within the receptacle itself. This is recognized as a significant hazard in households with toddlers and small children, and has led to the development of various devices for locking electrical plugs to an outlet to preclude a child from disengaging the plug and having access to the outlet. Also, various receptacle covers or guards have been developed in the past for covering unused receptacles.

Still, the conventional electrical receptacle provides relatively little shielding for the receptacle contacts, which are generally recessed only about one eighth of an inch from the face of the receptacle. Considering that the contact prongs of the typical 110 volt electrical appliance are about five eighths of an inch long, it will be seen that the two electrical prongs of a conventional electrical appliance plug may be conducting electricity from an outlet receptacle with as little as one eighth of an inch of each prong inserted into the receptacle. In other words, about one half inch of each of the prongs may be exposed during insertion and removal of an electrical plug into or from an outlet, and still be conducting electricity to the electric appliance connected to the plug. This poses a significant hazard to a person manipulating the plug, as oftentimes the prongs provide a tight fit into a receptacle, and many plugs are difficult to grip at other than the extreme base, where one's fingers may contact the prongs.

Accordingly, a need will be seen for an electrical outlet safety plate which precludes contact with the prongs of an electric plug during the insertion or removal of the plug into or from the outlet receptacle. The present safety plate is raised to provide a thickness of about one half inch from the underlying surface. This provides sufficient safety, as electrical outlets are conventionally installed flush with the surface. The present safety plate includes one or more recesses corresponding to the one or more electrical receptacles of conventional electrical outlets, with the recesses being dimensioned and configured to provide a close fit about a conventional electrical plug inserted therein.

Thus, by the time the contact prongs of the electrical plug have been withdrawn sufficiently from the receptacle for a person to touch the contact prongs, the prongs have been withdrawn sufficiently far from the receptacle so as to break contact with the receptacle contacts, thereby providing complete safety for a person using the present invention. It will be seen that the reverse is also true, as when a plug is being inserted into the receptacle, the non-conductive base of the plug is immediately adjacent the raised face of the present safety plate before the tips of the plug prongs may make contact with the electrical contacts within the outlet receptacle, thus precluding contact with a "hot" prong of the plug by a user of the present safety plate.

A discussion of the related art of which the present inventor is aware, and its differences and distinctions from the present invention, is provided below.

U.S. Pat. No. 2,634,016 issued on Apr. 7, 1953 to Elsie J. Hagen, titled "Shield For Wall Switches," describes a plate for placement between a conventional electrical switch cover plate and the adjacent surface, for precluding marring of the adjacent surface due to contact by users of the switch over a long period of time. While electrical switch plates and electrical outlet plates are standardized to be of essentially the same dimensions, thereby allowing the Hansen shield to be installed behind a conventional electrical outlet cover plate, such an installation would do nothing to obviate the problem addressed by the present invention, due to the width of the central opening in the Hagen shield. In other words, the Hagen shield does not replace a cover plate, but rather provides an extended border for the conventional plate installed therein.

U.S. Pat. No. 3,363,216 issued on Jan. 9, 1968 to Patrick J. Benedetto, titled "Safety Attachment For Electrical Outlet Fixtures," describes a plate for installing over or in lieu of a conventional outlet plate. The Benedetto plate includes a pair of threaded cylindrical extensions projecting therefrom, for connecting to a mating threaded adapter fitting over an electrical plug. When the plug is inserted into the outlet receptacle and the cover screwed onto the adapter, access to the plug is precluded. However, the cylindrical extensions do not provide the required protection from contact with an electrically conducting plug prong during insertion or removal of the plug from the outlet, even when the cover is not used. This is due to the need to make the Benedetto extension in a circular shape in order for the cover to be rotatingly screwed thereto, resulting in excessive clearance about the top and bottom surfaces of the relatively flat, two prong plug illustrated in the Benedetto patent. Even in the case of plugs with a grounding pin extending therefrom, the surface of the plug opposite the ground pin is typically relatively flat and close to the extended electrical prongs of the plug. Thus, a person desiring a good purchase on a plug installed in a receptacle surrounded by the Benedetto attachment, could still extend his or her fingers into the round extension and contact the prongs of a partially inserted electrical plug. The present safety plate precludes this, due to the specially configured openings which conform closely to the contours of a conventional electrical plug.

U.S. Pat. No. 4,059,327 issued on Nov. 22, 1977 to Donald S. Vann, titled "Recessed Electrical Outlet," describes an electrical outlet box adapted for recessing the receptacles therein beneath or behind the surface in which the box is installed. This precludes the protrusion of electrical plugs and the like from the plane of the surface, thereby allowing furniture or other articles to be positioned immediately adjacent the surface without damage to the electrical plugs or receptacles into which they are installed. However, the recessed receptacle is still fully accessible to the fingers or hand of a person installing or removing an electrical plug therein, and does not provide a closely fitting recess into which the plug is installed, precluding simultaneous insertion of a finger or the like therein as provided by the present invention.

U.S. Pat. No. 4,918,259 issued on Apr. 17, 1990 to William L. Hanson, titled "Electrical Outlet Box Extension Cover," describes a two piece assembly, with the first component serving the purpose of a conventional outlet cover plate. The first component is adapted to be inset into the built out wall, with a second component engaging the walls of the first component and seating therewithin to provide a finished appearance for the electrical outlet inset into the built out wall structure. However, the resulting opening in the finished assembly still has essentially the same dimensions as the original outlet cover plate, thus allowing a person to insert their fingers inadvertently against the prongs of an electrical plug during insertion or removal of the plug from the outlet receptacle.

U.S. Pat. No. 4,936,794 issued on Jun. 26, 1990 to Robert L. Shaw et al., titled "Recessed A C Wall Outlet," describes an outlet box which provides for the recessed installation of the electrical outlet and receptacles therein. The device functions much like the device of the Vann U.S. Patent discussed further above, in that the faces of the receptacles are recessed so that an installed electrical plug does not protrude past the plane of the surface in which the Shaw outlet box is installed. However, the accessible width of the box is still essentially the same as a conventional wall outlet, thus allowing a person to reach into the recess and contact the prongs of an electrical plug during removal or insertion of the plug, which action is precluded by the recesses of the present outlet safety plate which closely fit the plug.

U.S. Pat. No. 5,589,665 issued on Dec. 31, 1996 to Randal Scamacca, titled "Child-Resistant Electrical Outlet Cover," describes a raised outlet cover plate having two circular passages or recesses therein for accessing the electrical receptacles of the outlet. Generally cylindrical guards are provided, which engage the walls of the recesses. The guards include slots therein, which mate with inwardly extending pins in the recesses, as in a bayonet type fitting. The circular recesses must thus be considerably larger than the dimensions of an electrical plug, as the cylindrical guard must fit over the electrical plug and the guard must fit within the recess. As the guard is rotated within the recess to lock the guard in place, the recesses must be circular, thus leading to the same clearance problem described further above with the circular extensions of the Benedetto device. This enables a person to insert a finger between the walls of the recess and the bottom of an electrical plug inserted therein. The present safety plate fits much more closely about a plug, precluding such finger insertion.

Finally, U.S. Pat. No. D-310,319 issued on Sep. 4, 1990 to Larry W. Brookman, titled "Wall Outlet Guard," illustrates a guard which is separate from the cover plate and which attaches conventionally to the underlying outlet. No dimensions or materials are described, so it cannot be determined if the device provides the same protection of the present invention. In any event, as the device is secured to the underlying outlet by only a single central screw, the device may be rotated about the central screw to provide clearance to the underlying outlet receptacles. The present safety plate integrates the walls of the receptacle recesses with the plate as a unitary construction, thus precluding the shifting of the device away from the receptacles.

None of the above inventions and patents, either singly or in combination, is seen to describe the instant invention as claimed.

SUMMARY OF THE INVENTION

The present invention comprises an electrical outlet safety plate, providing a receptacle recess configured and dimensioned to fit closely about a conventional electrical plug inserted therein in order to preclude simultaneous entry of the finger of a user of the outlet, into the recess when the plug is being inserted therein or removed therefrom. The plate has a thickness of about one half inch, which provides a sufficient depth for the recesses to ensure that the face of the plug is at least flush with the outer face of the recess, thereby precluding entry of any other articles therein, before the electrical contact prongs of the plug come into contact with the electrical contacts within the receptacle. Thus, even if a person places their fingers on the electrical contact prongs of the plug as it is being inserted into the receptacle, the extended thickness of the present safety plate and its closely fitting receptacles, keep the fingers from touching the prongs of the plug when they are in electrical contact with the receptacle contacts. Various embodiments of guards or covers configured for the recesses of the present plate are also provided.

Accordingly, it is a principal object of the invention to provide an improved electrical outlet safety plate for precluding contact of a person's fingers with the prongs of an electric plug, when the plug is inserted into a receptacle sufficiently deep for the prongs to contact the electrical contacts of the receptacle.

It is another object of the invention to provide an improved safety plate having a thickness of about one half inch, for providing sufficient depth to preclude simultaneous contact of the contact prongs of an electrical plug with the electrical contacts of a receptacle and the fingers of a user of the plug.

It is a further object of the invention to provide an improved safety plate which electrical plug recesses are configured for closely fitting about a conventional electrical plug.

An additional object of the invention is to provide an improved safety plate which is configured to replace a conventional electrical outlet cover plate with no modifications to the underlying electrical outlet or receptacles.

Still another object of the invention is to provide improved receptacle covers or guards configured for fitting closely within the recesses of the present electrical outlet safety plate.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
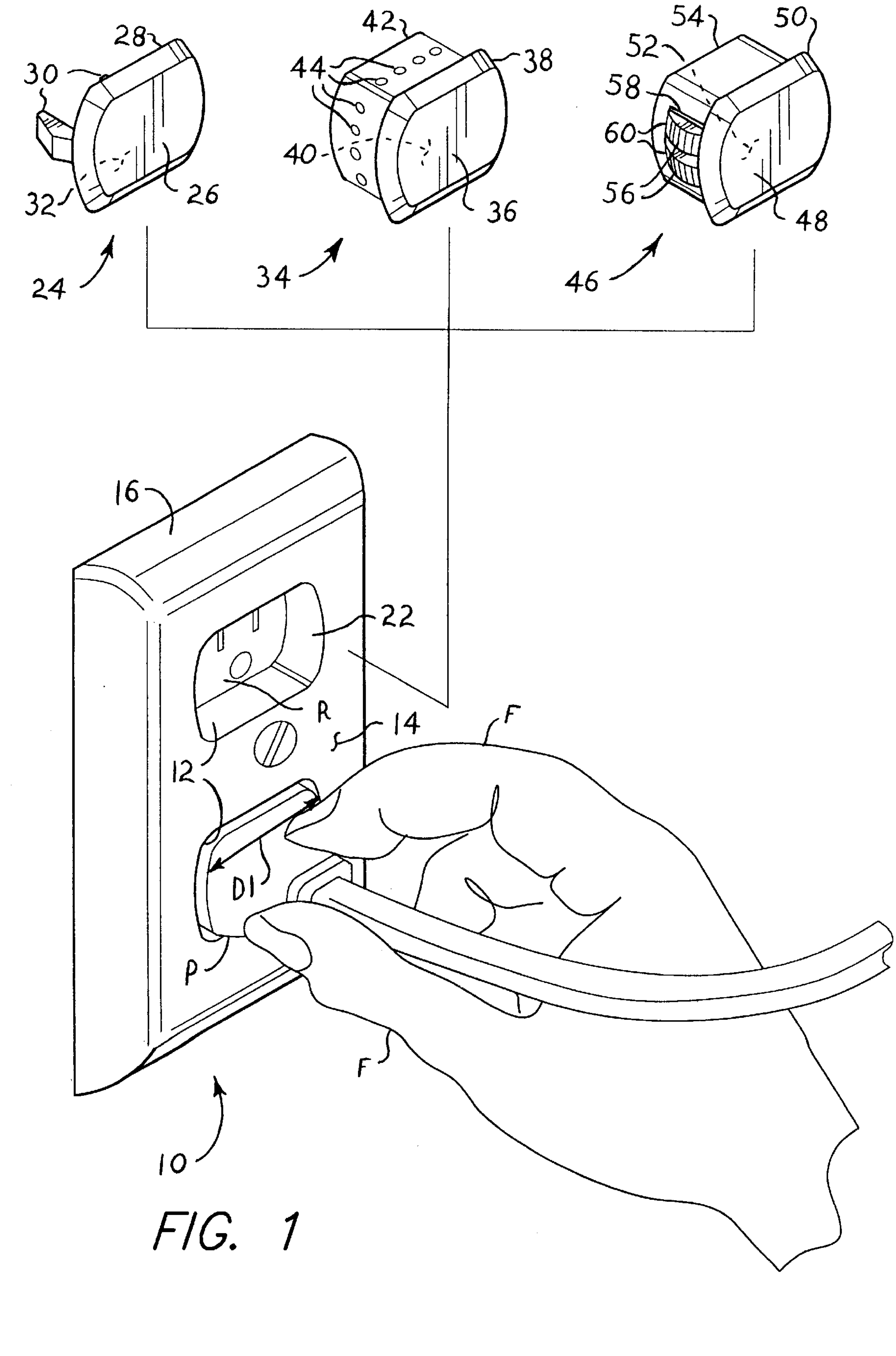
FIG. 1 is an environmental perspective view of the present electrical outlet safety plate, showing its installation and use and the alternative removable installation of corresponding receptacle guards therewith.

The present invention comprises an electrical outlet safety plate, designated by the reference numeral 10 throughout the drawings. FIG. 1 provides a general view of the present safety plate 10 in use, with the thickness of the plate 10 and depth of its plug passages 12 being clearly shown. It will be noted that the fingers and thumb (both generally indicated by the reference character F) cannot come into contact with any portion of the electrical plug P forward of the body of the plug P, when the electrical contact prongs of the plug P are making electrical contact with the electrical contacts of the electrical outlet O to which the present safety plate 10 is installed.

Figure 2:
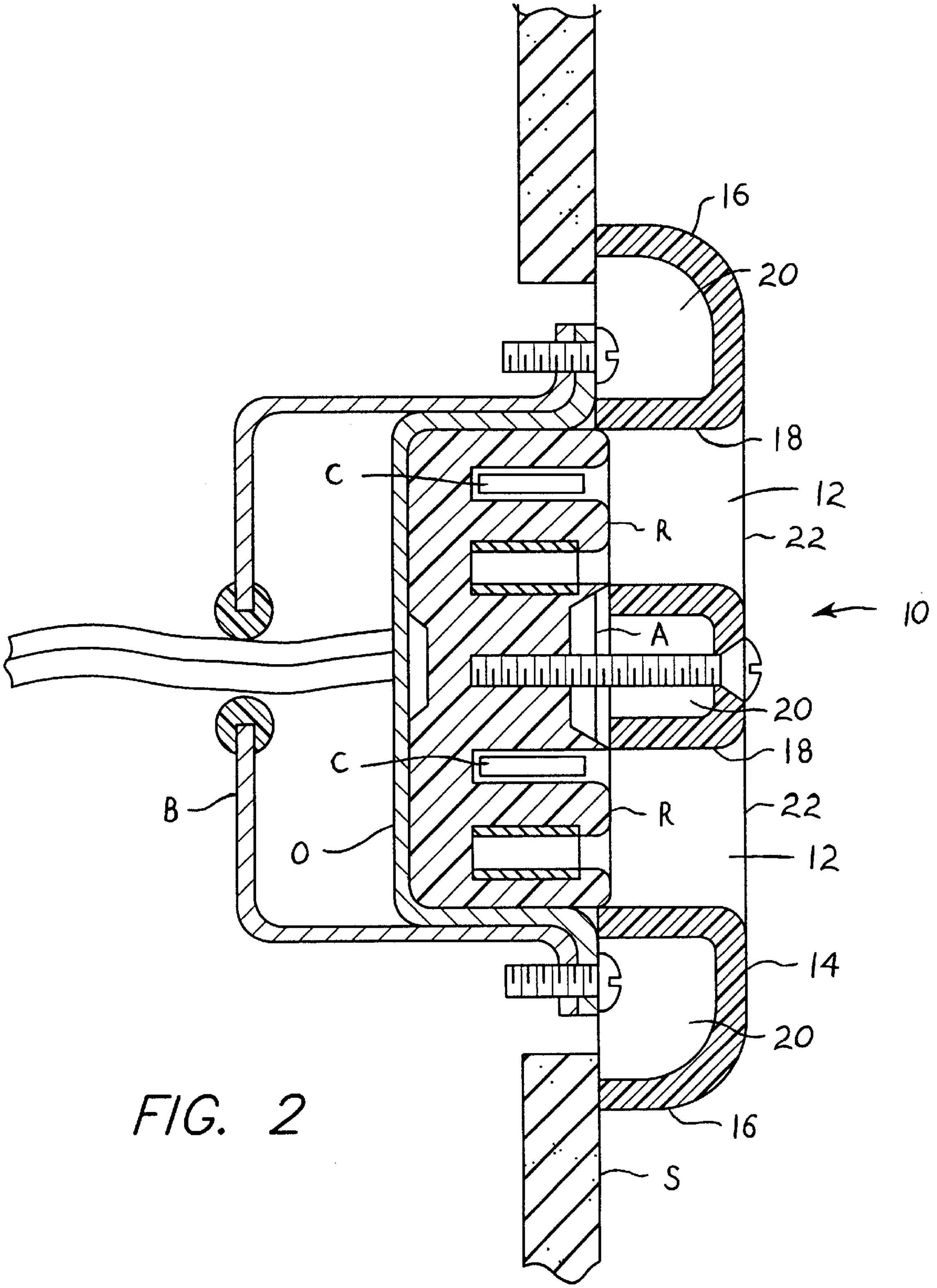
FIG. 2 is a side elevation in section of a conventional electrical outlet with two receptacles therein, showing the installation of the present safety plate thereto.

FIG. 2 provides a detailed elevation view in section of the present safety plate 10 and an electrical outlet O and electrical box B to which the present safety plate 10 is installed. While the safety plate 10 shown throughout the drawings includes two electrical plug passages 12 for installing in registry with a corresponding number of electrical receptacles R, it will be seen that the present safety plate 10 may be formed to fit electrical outlets having only a single electrical receptacle, or multiple outlets having four, six, or some other number of outlets, as desired. While any of a number of materials may be used in the manufacture of the present safety cover plate 10, the plate 10 is preferably monolithically formed as a single unitary component using an electrically non-conductive material, such as a suitable plastic.

The present safety plate 10 includes a generally rectangular raised outer or front face 14 spaced away from the outer face A of an installed electrical outlet O, which is in turn installed substantially flush or coplanar with a surface S, such as a wall or other surface as desired. The plate 10 includes a generally rectangular periphery 16 depending from the front face 14 of the plate 10, with the depending periphery 16 serving to displace the front face 14 of the plate 10 outwardly from the outlet 0 and its receptacles R. The front face 14, depending periphery 16, and inner wall(s) 18 of the plug passage(s) 12, all serve to define a hollow interior 20 for the present outlet safety cover plate 10, to economize on material and produce a lighter weight article. Alternatively, the present safety cover plate 10 could be formed as a solid block, devoid of any hollow interior spaces, if so desired.

As noted above, the periphery 16, in combination with the depending inner walls 18 of the electrical plug passages 12, serve to displace the front face 14 of the plate 10 away from the front or outer face A of the underlying electrical outlet O to which the present plate 10 is secured. Conventional receptacles R include a plurality of electrical conductors C therein, with the outermost ends thereof being inset from the front face A of the receptacle on the order of one eighth of an inch or so. As the corresponding electrically conductive prongs N extend from the face E of an electrical plug P on the order of about five eighths of an inch, it will be seen that about one half inch of the prongs N may be exposed when they are contacting the receptacle conductors C.

Accordingly, safety cover plate 10 is preferably formed with the depending periphery 16, and inner walls 18 of plug passage(s) 12, depending about one half inch from the front face 14 of plate 10. When an electrical plug P is inserted through front opening 22 of plug passage 12 and into a corresponding electrical receptacle R in registry with that passage 12, as shown in FIGS. 3A through 3D, the face E of the plug P will be essentially coplanar with the outer face 14 of safety plate 10 by the time the distal tips of the electrically conductive prongs N contact the electrical conductors C of the receptacle R. It will thus be seen that no articles, such as fingers F or other article which may potentially result in an electrical shock hazard, may be placed in contact with the prongs N of the plug P at a time when the prongs N are in contact with the corresponding electrical conductors C of the receptacle R.

Conventional electrical plugs P have a flattened or generally oval shape, with a major diameter D1 (shown in FIG. 1) in the plane of the two normally electrically conducting prongs N and a smaller, minor diameter D2 perpendicular to the plane of the prongs N, through the ground prong G. The plug passage(s) 12 of safety plate 10 have a like configuration, as shown in FIG. 1, to conform substantially to the shape of a conventional plug P and to fit closely therearound when the plug P is inserted through the passage 12 of the plate 10. This serves to reduce further any gap which may be defined between the plug P and the passage 12, to reduce further any possibility of any article contacting the plug prongs N when they are in contact with the receptacle conductors C.

Figure 3A:
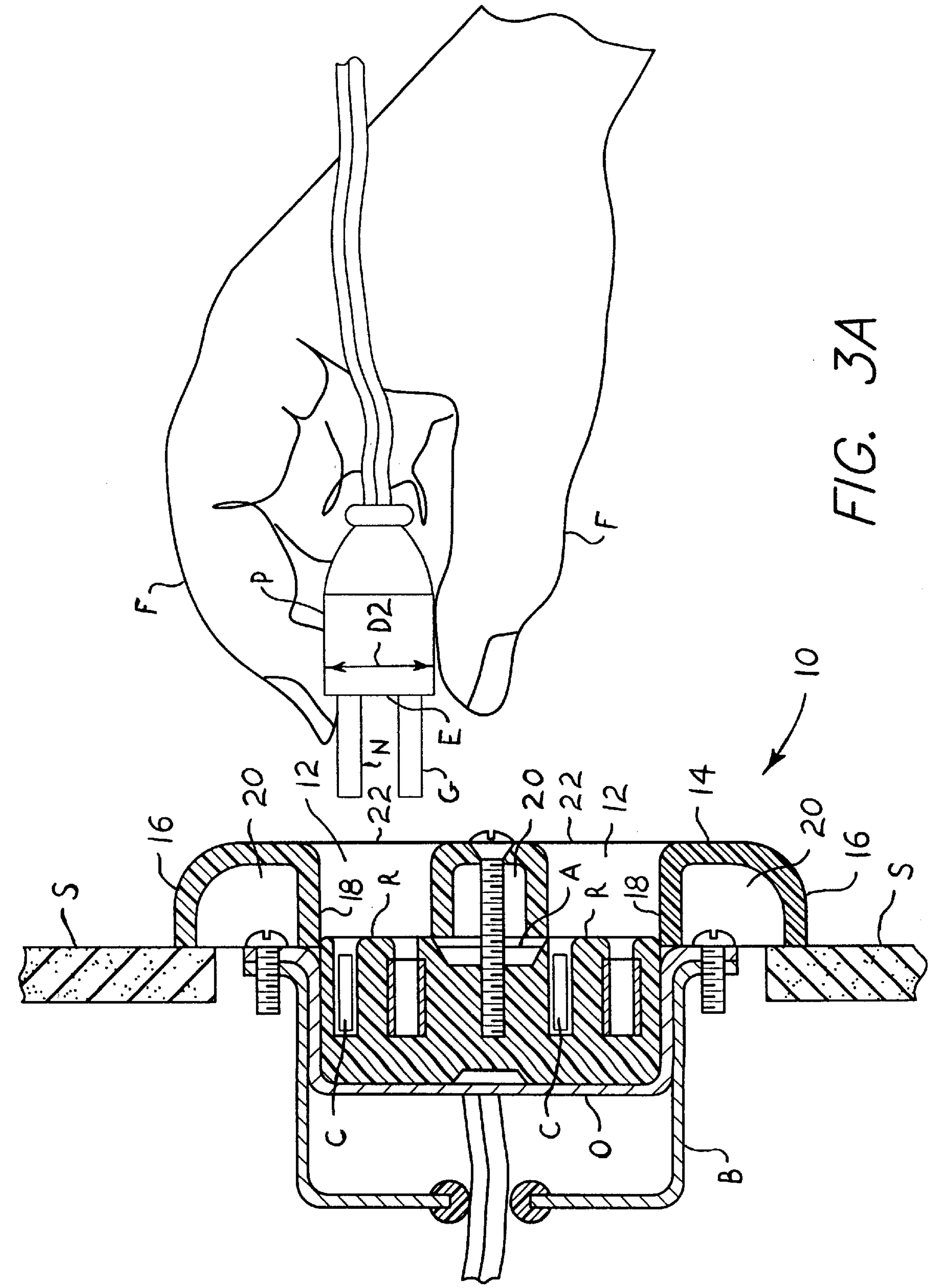
FIG. 3A is a side elevation view in section similar to FIG. 3A, showing a user about to insert an electrical plug into a receptacle of the outlet protected by the present plate.

FIGS. 3A through 3D illustrate the insertion of an electrical plug P into an electrical receptacle R protected by the present safety plate 10. In FIG. 3A, the plug P and its electrical contact and ground prongs N and G have not yet been inserted through the plug passage 12 of the safety plate 10, and into the corresponding receptacle R of the outlet O. It will be noted that the upper finger F of the user of the plug is contacting one of the electrically conductive prongs N of the plug P.

Figure 3B:
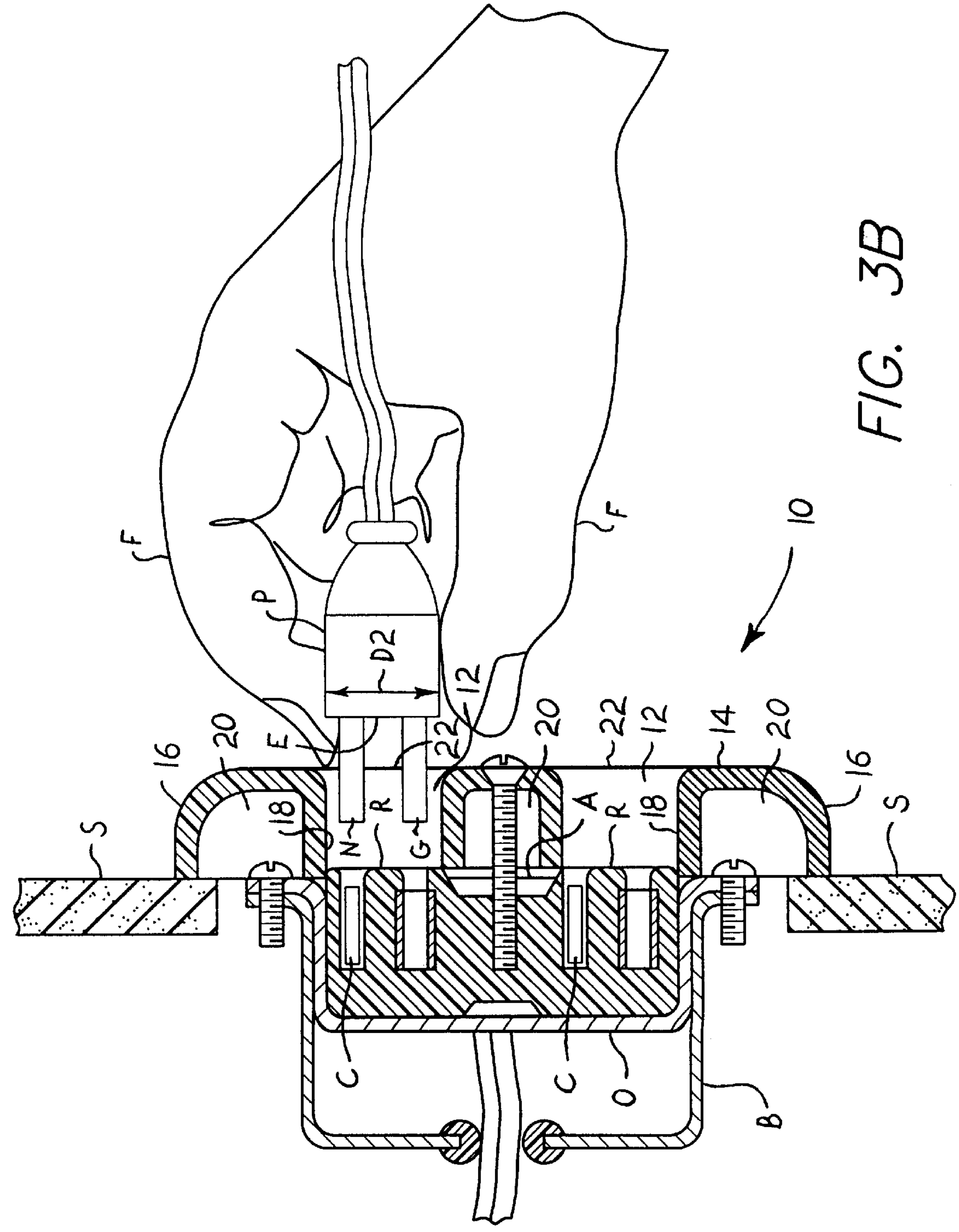
FIG. 3B is a side elevation view in section similar to FIG. 3A, showing the initial insertion of the electric plug prongs into the recess.

In FIG. 3B, the prongs N and G have been partially inserted into the first plug passage 12 of the safety plate 10, but due to the depth of the plug passage 22, the prongs N and G have not yet reached the receptacle R, much less contacted the receptacle contacts C. As the prongs N and G have not yet been completely inserted into the plug passage 12 of the plate 10, the fingers F of a user of the plug P may still be in contact with one or more of the electrically conductive prongs N, as shown in FIG. 3B.

Figure 3C:
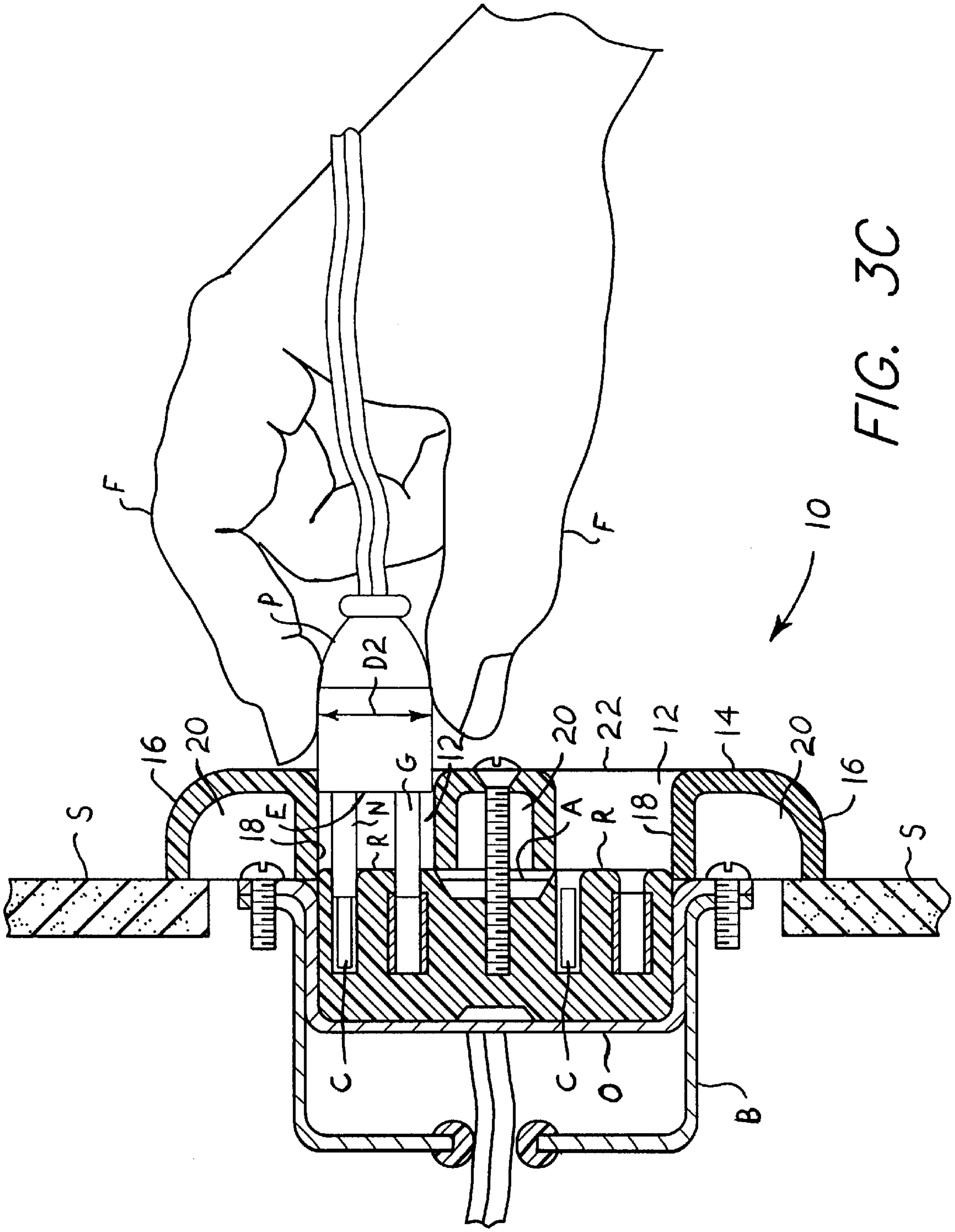
FIG. 3C is a side elevation view in section similar to FIGS. 3A and 3B, showing the prevention of contact of the user's fingers with the prongs of the electrical plug, as the prongs contact the electrical contacts of the receptacle.

In FIG. 3C, the prongs N of the plug P have finally made contact with the electrical contacts C of the upper or first receptacle R of the outlet 0. However, in order for the prongs N to reach a point where they may make such contact, the front face E of the plug P must be past the front face 14 of the safety plate 10. Due to the closely congruent fit of the generally oval shaped plug passage 12 about the correspondingly shaped plug P, it will be seen that the fingers F of a user of the plug P, are pushed back along the plug P by contact with the front face 14 of the safety plate 10, and thus cannot contact the prongs N to receive a shock.

Figure 3D:
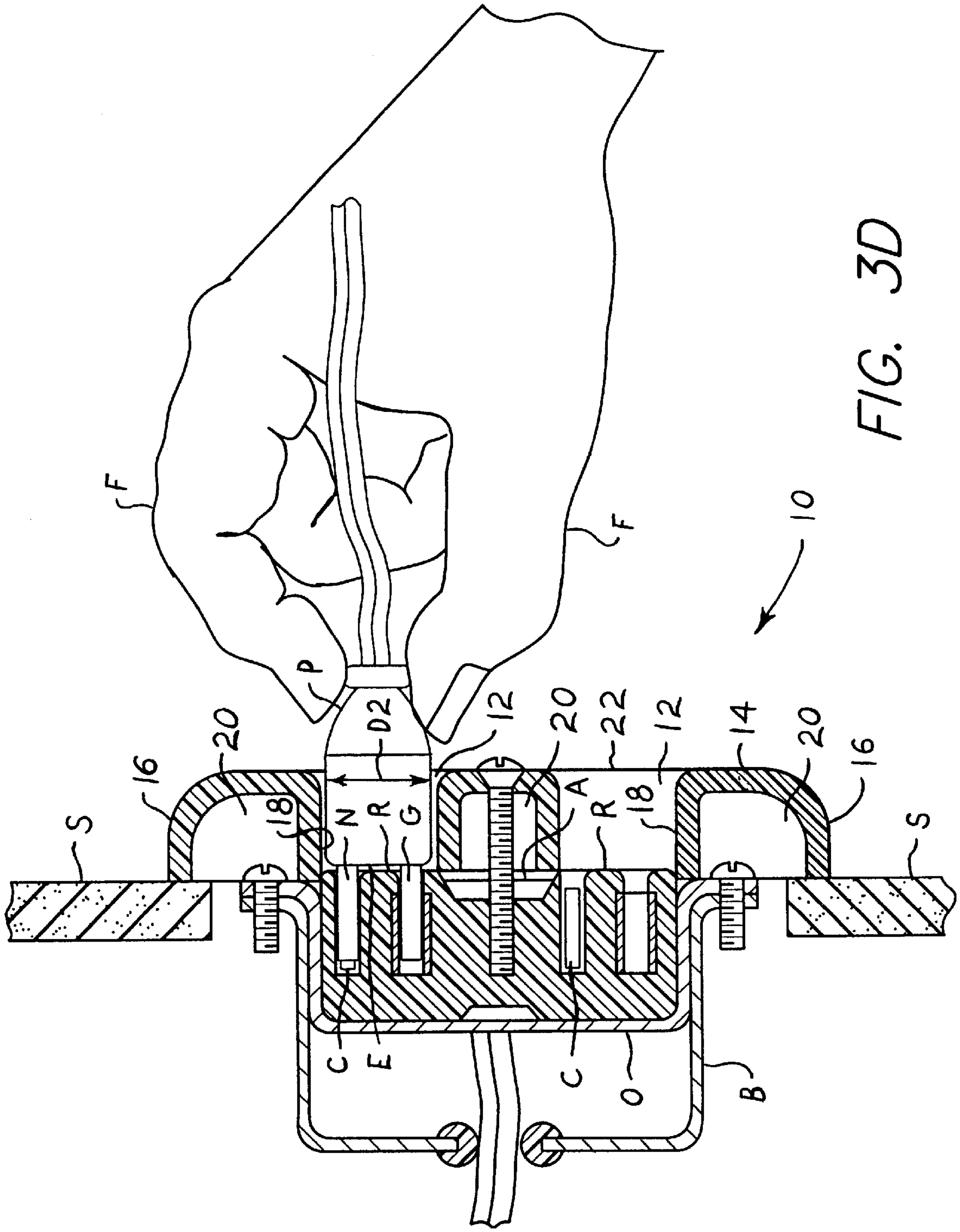
FIG. 3D is a side elevation view in section similar to FIGS. 3A through 3C, showing the completed installation of the electrical plug into a receptacle of the outlet protected by the present safety plate.

Finally, FIG. 3D illustrates the completed insertion of the plug P through the first or upper plug passage 12, with the front face E of the plug P being essentially seated against the front of the receptacle R. The prongs N have reached their maximum depth in the receptacle R, to receive electrical power from the corresponding electrical contacts C of the first or upper receptacle R. It will be noted that the body of the plug P is inserted at least partially through the first or upper plug passage 12 of the safety cover plate 10, thus completely precluding any direct contact by any article with the electrical contact C of the receptacle R. The preclusion of contact with the electrical prongs N of the plug P is maintained when the plug P is withdrawn from the receptacle R, as the plug prongs N are not directly accessible to a person removing the plug P, until the plug P body has been removed from the safety cover plate 10 sufficiently far to remove the prongs N from electrical contact with the corresponding electrical contacts C.

Figure 4:
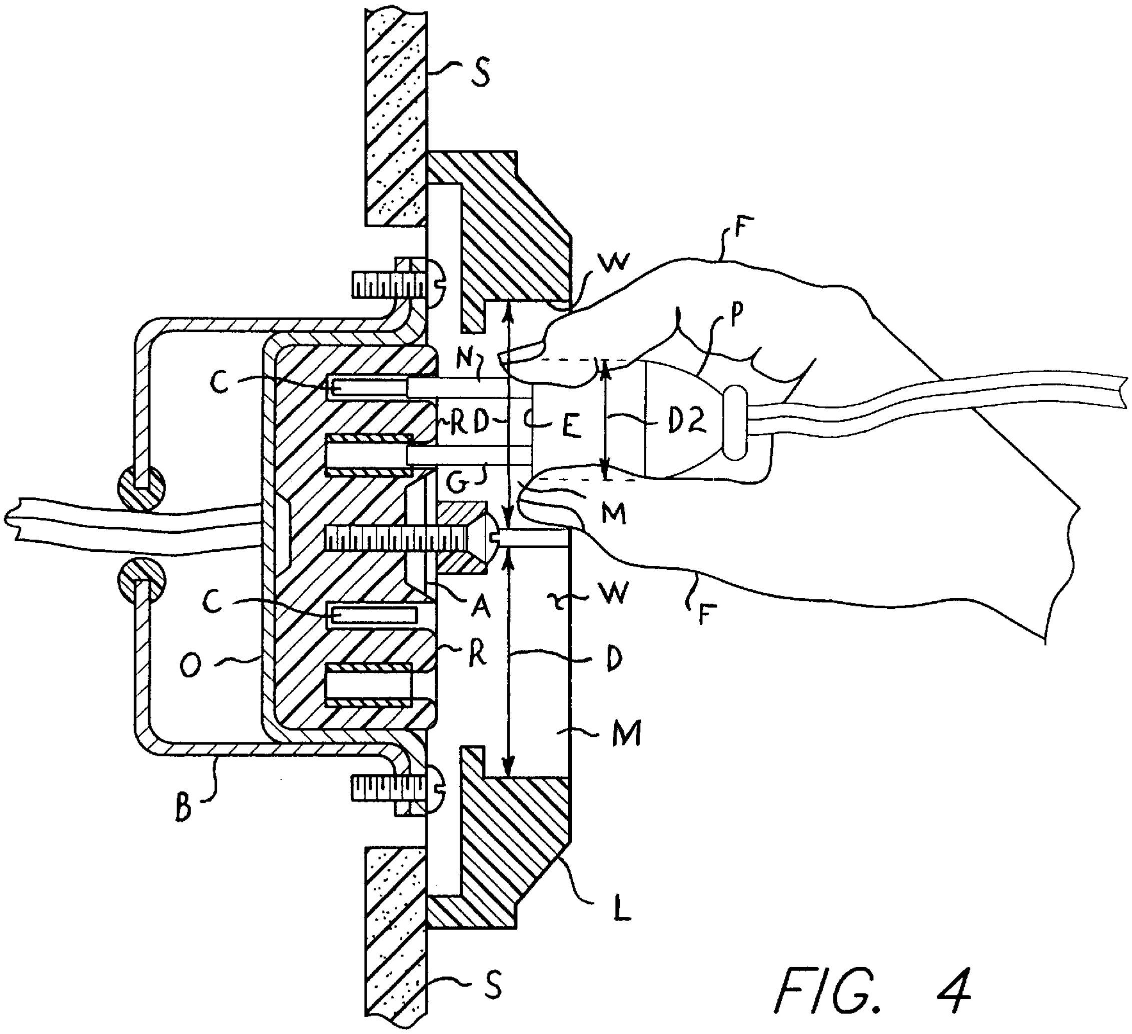
FIG. 4 (PRIOR ART)
FIG. 4 is a side elevation in section of a prior art, conventional electrical outlet with two receptacles therein.

FIG. 4 illustrates a specialized cover plate L of the prior art, for the sake of comparison. This cover plate L is similar to that disclosed in U.S. Pat. No. 5,589,665 to Scamacca, discussed further above in the Description of the Related Art. This cover plate L is adapted to receive a rotary locking element (not shown), and as such, each of the plug passages M must be round or circular. In addition, the diameter D of the plug passages M must be somewhat larger than that required for clearance from the plug P, due to the need to accept the locking sleeve which fits around the plug P.

As the plug passages M of the prior art cover plate L are circular and larger than the major diameter of the plug P due to the locking component, there may be a substantial gap between the minor diameter D2 of the plug P and the inner wall W of the plug passage M. When a conventional electrical plug P is inserted into such a plug passage M, it will be noted that the relatively small minor diameter D2 of the plug P, is considerably smaller than the diameter D of the plug passage M. This provides a sufficient gap between the inner wall W of the plug passage M of the prior art plate L, and the upper or lower surface of the plug P across its minor diameter D2, that a finger F may very easily be inadvertently inserted into the plug passage M of the plate L, while still in contact with the prongs N of the plug P, with the prongs N of the plug P reaching and contacting the electrical contacts C of the receptacle R.

The locking sleeve associated with this prior art plate L does nothing to protect a person during insertion and withdrawal of the plug P from an outlet covered by such a plate L, as the locking sleeve cannot be installed within the plug passage M until the plug P is completely seated, and must be removed from the plug passage M before the plug P may be removed from the corresponding outlet receptacle R. Thus, only the present safety cover plate 10 provides absolute protection from electrical shock for a person inserting or withdrawing an electrical plug P from an electrical outlet receptacle R.

Returning to FIG. 1, further means for providing safety from electrical shock is disclosed by means of various embodiments of guard covers removably installable over the plug passages 12 of the present safety cover plate 10. These covers serve to prevent access to the electrical contacts C within a receptacle R, when no electrical plug P is inserted therein. While various safety covers have been developed in the past, they include electrically nonconductive prongs which insert into the receptacle R passages and are not operable with the present safety cover plate 10, due to its extension above the underlying electrical receptacles R.

A first embodiment guard cover 24 is shown to the upper left of FIG. 1. The guard cover 24 includes a cover panel 26 having a generally oval shape, corresponding to the generally oval shape of the plug passages 12 of the present electrical outlet safety cover plate 10. However, the periphery 28 of the cover panel 26 is somewhat larger than the plug passages 12, to preclude insertion of the cover panel or plate 26 into one of the plug passages 12. Thus, the cover panel 26 extends completely across the front opening 22 of the corresponding plug passage 12 over which it is removably installed, precluding access to the underlying plug passage 12 and corresponding electrical receptacle R. Grip means comprising at least two oppositely disposed resilient prongs 30 extend from the rear surface 32 of the cover panel 26, with the prongs 30 frictionally and resiliently engaging the inner walls 18 of the corresponding plug passage 12 to secure the guard cover 24 in place as desired.

It will be noted that the securing prongs 30 do not meet with the corresponding electrical contact passages of the electrical receptacle R over which the guard cover 24 is installed, as in prior art receptacle covers. Rather, the securing prongs are disposed adjacent the periphery 28 of the cover 24, in order to bear resiliently and frictionally against the inner walls 18 of the safety plate 10. As the prongs do not engage the electrical contacts C within the receptacle R, the cover 24 (and other receptacle cover embodiments) could be formed of electrically conductive material, as could the safety plate 10. However, the cover 24 and other cover embodiments are preferably formed of an electrically non-conductive material, such as plastic, to match the corresponding safety plate 10 with which they may be used.

A second embodiment 34 of the present guard cover invention is shown in the upper center of FIG. 1. The cover 34 includes a generally oval shaped cover panel 36 having a periphery 38 at least slightly larger than the corresponding plug passage 12 of the present safety plate 10, as in the case of the first guard cover 24 discussed above. However, the rear surface 40 of the cover panel 36 includes a hollow sleeve 42 extending therefrom, with the sleeve 42 formed to fit closely within a corresponding electrical plug passage 12 of the safety plate 10. A plurality of raised protuberances or bumps 44 are provided about the outer circumference of the sleeve 42, with the bumps 44 frictionally engaging the inner walls 18 of the corresponding plug passage 12, for removably securing the guard cover 34 thereto as desired.

Yet another embodiment 46 of the present guard cover invention is illustrated to the upper right of FIG. 1. The guard cover 46 also includes a cover panel 48 having a generally oval shaped periphery 50 at least slightly larger than the front opening 22 of a corresponding electrical plug passage 12 of the present electrical outlet safety plate 10, with the cover panel 48 having a rear surface 52 with a hollow sleeve 54 extending therefrom to conform closely to the inner walls 18 of the plug passage 12 of the safety plate 10.

The grip means extending from the sleeve 54 comprises a plurality (preferably two opposed) of pairs of outwardly extending lateral grips 56, which grip the inner walls 18 of the corresponding plug passage 12 to which the guard cover 46 is removably installed. (It will be understood that each of the guard covers 24, 34, and 46 are laterally symmetrical, with the grip means 56 shown on one side of the guard cover 46, being repeated in mirror image on the opposite side.) The grips 56 reside in corresponding slots 58 formed in the sleeve 54 of the guard cover 46, and are secured by one end thereof to the sleeve 54 by means of a live hinge 60. The grips 56 operate in a manner similar to the prongs 30 of the first embodiment guard cover 24, discussed further above, to grip the inner walls 18 of a corresponding electrical plug passage 12 frictionally and resiliently as desired. It will be seen that other means of providing frictional engagement with the walls 18 of the safety plate 10 may also be provided, as desired.

In summary, the present electrical outlet safety plate and the various embodiments of electrical receptacle guard covers specifically formed for use therewith, serve to provide considerably greater protection and security from electrical shock than was previously available. The safety plate, with its raised face and plug passages configured to conform closely to a conventional generally oval shaped electrical plug, preclude the inadvertent or intentional contact of any article against the electrical contact prongs of the plug when they are in electrical contact with the electrical contacts of the corresponding receptacle.

While a person may place one or more of their fingers in contact with the electrical contact prongs of the plug while initially attempting to insert the plug, the raised outer face of the safety plate causes the fingers to be pushed back along the electrically non-conductive body of the plug, and away from contact with the prongs, before the prongs make electrical contact with the electrical contacts of the receptacle. The reverse is also true, in that a person cannot touch the prongs of the electrical plug upon removal of the plug from the receptacle, until the prongs have been withdrawn sufficiently far so as to no longer make electrical contact with the contacts of the receptacle.

While conventional electrical receptacle covers are known, none are capable of operating with the present electrical outlet safety plate, due to their engaging the receptacle passages for securing to an outlet. As the depth of the present safety plate precludes the engagement of the prongs of such conventional outlet guards with the receptacle passages, the present disclosure also provides for various embodiments of outlet guard covers which include peripheral engagement means extending therefrom, for engaging the inner walls of the corresponding safety plate with which they are used. The combination of the present safety plate, with various guard embodiments for precluding the insertion of articles into the receptacle passages by small children or the like, provide an extremely secure and safe means of protecting all persons working in the vicinity of electrical outlets, or having occasion to insert or withdraw an electrical plug into or from such an outlet. Yet, the cost is very little, if any, more than conventional outlet plates and receptacle covers, thus enabling the present invention to be purchased and used by practically all individuals and businesses having need for such.

It is to be understood that the present invention is not limited to the embodiments described above, but encompasses any and all embodiments within the scope of the following claims.

I claim:

1. An electrical outlet safety plate, comprising:

an outlet cover plate formed of electrically non-conductive material, for installing over an electrical outlet;

said cover plate having a front face of a generally rectangular shape, configured for covering an electrical outlet box with the electrical outlet installed therein;

said cover plate further including at least one electrical plug passage formed therethrough;

said at least one plug passage having a front opening and inner walls of a generally oval shape substantially conforming to the shape of an electrical plug, and fitting closely about an electrical plug when the electrical plug is inserted into said at least one plug passage;

at least one guard cover formed of an electrically non-conductive material, for removably covering said at least one plug passage for temporarily restricting access thereto;

each of said at least one guard cover including a cover panel with a generally oval shape;

each said cover panel having a periphery larger than said at least one plug passage of said cover plate for precluding insertion of each said cover panel into said plug passage of said cover plate beyond said front face of said cover plate;

each said cover panel having a rear surface including a generally oval shaped hollow sleeve extending therefrom and having a plurality of outwardly extending protrusions disposed about said sleeve, for frictionally engaging said inner walls of said at least one plug passage of said cover plate.

2. The electrical outlet safety plate according to claim 1 wherein said at least one electrical plug passage is two passages, each said passage, upon installation of said cover plate, being disposed in registry with a receptacle of an electrical outlet having two receptacles.

3. The electrical outlet safety plate according to claim 1, wherein said cover plate and said at least one guard plate is formed of plastic.

4. The electrical outlet safety plate according to claim 1, wherein said at least one electrical plug passage of said cover plate has a depth of substantially one half inch.

5. The electrical outlet safety plate according to claim 1, wherein said front face of said cover plate includes a depending periphery, which with said front face and said inner walls of said at least one plug passage, define a hollow interior.

6. An electrical outlet safety plate and an electrical outlet and electrical plug assembly, comprising in combination:

an electrical outlet including an outer face providing for substantially coplanar installation with a surface, with said electrical outlet including at least one electrical receptacle having a plurality of electrical contacts therein;

an electrical plug having a generally oval shape and a face with a plurality of electrical contact prongs extending therefrom, with said electrical contact prongs of said plug corresponding to said electrical contacts within said at least one electrical receptacle of said electrical outlet;

an outlet cover plate formed of electrically non-conductive material, for installing over said electrical outlet;

said cover plate having a front face of generally rectangular shape, configured for covering an electrical outlet box with said electrical outlet installed therein;

said cover plate further including at least one electrical plug passage formed therethrough;

said at least one plug passage having a front opening and inner walls of a generally oval shape substantially conforming to said shape of said electrical plug, and fitting closely about said electrical plug when said electrical plug is inserted into said at least one plug passage, for precluding simultaneous contact of an article with any of said plurality of electrical contact prongs of said plug when any of said contact prongs are in electrical contact with any of said electrical contacts of said electrical receptacle;

at least one guard cover formed of an electrically non-conductive material, for removably covering said at least one plug passage for temporarily restricting access thereto;

each of said at least one guard cover including a cover panel with a generally oval shape;

each said cover panel having a periphery larger than said at least one plug passage of said cover plate for precluding insertion of each said cover panel into said plug passage of said cover plate beyond said front face of said cover plate;

each said cover panel having a rear surface including a generally oval shaved hollow sleeve extending therefrom and having a plurality of outwardly extending protrusions disposed about said sleeve, for frictionally engaging said inner walls of said at least one plug passage of said cover plate.

7. The electrical outlet safety plate and electrical outlet and electrical plug assembly combination according to claim 6, with said electrical outlet having a first and a second said receptacle, said outlet plate including a first and a second said electrical plug passage formed therethrough and disposed in registry respectively with said first and said second receptacle of said electrical outlet when said cover plate is installed thereover.

8. The electrical outlet safety plate and electrical outlet and electrical plug assembly combination according to claim 6, wherein said cover plate and said at least one guard plate is formed of plastic.

9. The electrical outlet safety plate and electrical outlet and electrical plug assembly combination according to claim 6, wherein said at least one electrical plug passage of said cover plate has a depth of substantially one half inch.

10. The electrical outlet safety plate and electrical outlet and electrical plug assembly combination according to claim 6, wherein said front face of said cover plate includes a depending periphery, which with said front face and said inner walls of said at least one plug passage, define a hollow interior.

11. An electrical outlet safety plate, comprising:

an outlet cover plate formed of electrically non-conductive material, for installing over an electrical outlet;

said cover plate having a front face of a generally rectangular shape, configured for covering an electrical outlet box with an electrical outlet installed therein;

said cover plate further including at least one electrical plug passage formed therethrough;

said at least one plug passage having a front opening and inner walls of a generally oval shape substantially conforming to the shape of an electrical plug, and fitting closely about an electrical plug when an electrical plug is inserted into said at least one plug passage;

at least one guard cover formed of an electrically non-conductive material, for removably covering said at least one plug passage for temporarily restricting access thereto;

each of said at least one guard cover including a cover panel with a generally oval shape;

each said cover panel having a periphery larger than said at least one plug passage of said cover plate for precluding insertion of each said cover panel into said plug passage of said cover plate beyond said front face of said cover plate;

each said cover panel having a rear surface including a generally oval shaped hollow sleeve extending therefrom and having a plurality of outwardly extending oppositely disposed resilient lateral grips extending from said sleeve, for frictionally engaging said inner walls of said at least one plug passage of said cover plate.

* * * * *